United States Patent [19]
Thompson et al.

[11] 3,821,416
[45] June 28, 1974

[54] DRIED BREWERS GRAIN IN HIGH ENERGY ANIMAL FEEDS

[75] Inventors: Granville B. Thompson, Crestwood; Robert D. Seeley, Columbia, both of Mo.

[73] Assignees: The Curators of the University of Missouri, Columbia, Mo. ; by said Thompson; Anheuser-Busch, Incorporated, St. Louis, Mo. ; by said Seeley

[22] Filed: July 1, 1971

[21] Appl. No.: 158,988

[52] U.S. Cl..................... 426/2, 426/807, 426/377, 426/810
[51] Int. Cl............................................... A23k 1/00
[58] Field of Search.......... 99/2, 5, 83, 53; 426/208, 426/210, 205, 377

[56] References Cited
UNITED STATES PATENTS

| | | | |
|---|---|---|---|
| 2,592,348 | 4/1952 | Siefker | 99/5 |
| 2,754,211 | 7/1956 | Siefker | 99/2 |
| 2,806,789 | 9/1957 | Kiser | 99/2 ND |
| 3,212,902 | 10/1965 | Bavisotto | 99/5 |
| 3,503,751 | 3/1970 | Durham | 99/2 |

OTHER PUBLICATIONS

Morrison Feeds and Feeding, 22nd Ed., Morrison Pub. Co., 1957, p. 305.
Feeds and Feeding, – Morrison, p. 450, 451 Morrison Pub. Co., Ithaca, N.Y. 1957.
Handbook of Feedstuffs, – Seiden, p. 66, Springer Pub. Co., New York, 1957.

*Primary Examiner*—Norman Yudkoff
*Assistant Examiner*—Hiram H. Bernstein
*Attorney, Agent, or Firm*—Gravely, Leider & Woodruff

[57] ABSTRACT

This disclosure relates to a method of preventing liver abscesses in the feeding of cattle on high concentrate rations, i.e., those rations containing more than 75 percent corn, by incorporating up to about 20 percent by weight dried brewers grains in the ration.

8 Claims, No Drawings

DRIED BREWERS GRAIN IN HIGH ENERGY ANIMAL FEEDS

BACKGROUND OF THE INVENTION

In the preparation of finishing rations for beef cattle, it has been the general practice to feed high energy concentrates, such as corn, grain sorghums, wheat, barley, molasses, etc., with a protein supplement and a source of roughage, such as alfalfa, hay, silage, cottonseed hulls, corn cobs or oat hulls. High energy concentrates are feedstuffs with a high caloric density and are generally low in fiber. Roughages are feedstuffs generally high in fiber (bulk) and low in caloric density.

By increasing the percentage of high energy concentrates in the feeds, one can maximize the weight gain per day of the animals while reducing the cost of the finishing rations. However, when the percent roughage is reduced to below 20 percent, in an all concentrate ration there is a significant development of abscessed livers in the cattle. In a 1967 statistical summary of the Federal Meat Inspection Service for the U.S.D.A., 9.6 percent of the livers of over 27 million head of cattle were condemned because of liver abscesses. These liver abscesses have been correlated with the occurrence of rumenitis, an inflammation of the rumen in cattle. Rumenitis commonly develops in cattle fed high concentrate—low roughage — low crude fiber rations.

In a 1970 Nebraska Agricultural Experiment Station publication it was reported that 65 percent of 84 head of cattle finished on an all concentrate rations developed liver abscesses. When the roughage level was increased to 5, 10 and 15 percent in the ration the percentage of cattle with liver abscesses was 38.0, 32.6 and 32.2 percent, respectively.

The liver abscesses primarily result from infection of the organism *Spherophorus necrophorus*. In some instances liver abscesses develop in the presence of other bacteria, such as streptococci, staphylococcia and corynebacteria. *S. necrophorus* is always present in the stomach of the cattle and it is believed that during the condition of rumenitis the bacteria penetrates through the walls of the rumen and enters the rumenal branches of the portal vein. From the portal vein the bacteria reaches the liver.

The development of liver abscesses is of significant economic importance as not only is the liver condemned, but also decreased feed conversion and decreased weight gains occur in the cattle with severe cases of liver abscesses. It is calculated that there is a $9.30 loss per steer with an abscessed liver, based on the 1967 figures.

Heretofore liver abscesses had been prevented by including in the diet higher levels of roughage and/or a broad spectrum of antibiotic. Even in such feeding trials it has been reported that a 15 to 20 percent incidence of liver abscesses occur.

The principal objective of this invention is the prevention of liver abscesses in finishing beef cattle which are fed rations containing 80 percent or more of high energy concentrates such as corn, milo and barley by the inclusion of 20 percent or less of dried brewers grains in the ration. The ration also may contain a protein supplement, and the usual vitamins, minerals and hormones required by cattle for optimal weight gain. Another objective of this invention is to manufacture a supplement for high energy rations, said supplement containing sufficient brewers grains so that if fed to cattle with a source of high energy concentrates, the cattle do not develop liver abscesses. The supplement provides 20 percent or less brewers grains to the ration. Another objective of this invention is to provide a ration containing sufficient roughage from dried brewers grains to prevent the development of liver abscesses where the ration contains 80 percent or more of high energy concentrates. Other sources of roughage may be included in the ration as well as minor amounts of antibiotics, but brewers grains is required for maximal prevention of liver abscesses.

SUMMARY OF THE INVENTION

We have discovered that it is possible to prevent the occurrence of liver abscesses in cattle feed on high-concentrate rations containing more than 75 percent corn by the inclusion of dried brewers grains in the diet. The inclusion of dried brewers grains in the diet essentially completely eliminated the development of liver abscesses in finished beef cattle. The prevention of liver abscesses in the finished cattle occurred without the use of antibiotics and without high levels of roughage.

DETAILED DESCRIPTION

The official definition of the American Association of Feed Control Officials for brewers dried grains is as follows:

"Brewers dried grains is the dried extracted residue of barley malt alone or in mixture with other cereal grain or grain products resulting from the manufacture of wort and may contain pulverized spent hops in the amount not to exceed 3 percent evenly distributed." Dried brewers grains is considered a concentrate of medium caloric density having a moderate fiber (bulk) content. A typical analysis for dried brewers grains is shown in Table I.

TABLE I

| | % | |
|---|---|---|
| Dry Solids | 91.9 | |
| Fat | 7.1 | |
| Fiber | 15.4 | |
| Ash | 4.0 | |
| Protein (NX6.25) | 26.4 | |
| Calcium | 0.21 | |
| Phosphorus | 0.50 | |
| Potassium | 0.08 | |
| Metabolizable Energy | 2.39 | MCal/Kg |

The typical analysis for corn, a high-concentrate feedstuff, and ground corn cobs, a roughage with a low caloric density is shown in Table II.

TABLE II

| | Corn | | Corn Cobs | |
|---|---|---|---|---|
| | % | | % | |
| Ash | 1.1 | | 1.5 | |
| Crude Fiber | 2.0 | | 32.4 | |
| Ether Extract | 3.9 | | 0.5 | |
| N-free Extract | 73.1 | | 53.5 | |
| Protein (NX6.25) | 8.9 | | 2.5 | |
| Total Dry Matter | 89.0 | | 90.4 | |
| Metabolizable Energy | 3.29 | MCal/Kg | 1.70 | MCal/Kg |

A high concentrate ration is generally composed of 80 percent or more of corn or other grains, 10–15 percent of ground corn cobs, cottonseed hulls, silage or other sources of roughage and 5 percent of a supplement which provides the necessary additional protein, minerals, vitamins, hormones, etc., required in an optimal finishing ration. The protein could be from soybean meal and urea and should provide 11.5 percent crude protein. Such high concentrate rations have minimum net energy values of about 1.6 M Cal/Kg of ration. The net energy of a ration is the energy required by cattle to maintain body weight and for weight gain. The net energy values for the rations in Table III and Table IV are calculated on the basis of animal performance using the National Research Council requirements for maintenance and gain. The control ration and the 15 percent D.B.G. ration shown in Table IV contained approximately 1.7 M Cal/Kg of net energy. The ground corn-dried brewers grains rations in Table III had net energy values of 1.71–1.83 M Cal/Kg.

The dried brewers grains used in the rations of Examples I and II was composed of the dried extract of residue barley malt and also contained the extracted residues of rice and corn. The amount of spent hops was approximately 2 percent by weight. It is not known at this time why dried brewers grains effectively decreases and prevents the development of the typical liver abscesses in finishing cattle fed high concentrate rations. The therapeutic effect may be due to better quality fiber content of dried brewers grains as compared with other sources of roughage. As dried brewers grains has a low spent hop content, it also is possible that a residual hop antiseptic action may be inhibiting the growth of the *S. necrophorus* organisms. The combination of the fiber in dried brewers grains and the antiseptic effect of the hops may be preventing rumenitis to prevent the invasion of the portal veins with the organism *S. necrophorus*.

In any event, rations which contain up to 20 percent by weight dried brewers grains in combination with at least 75 percent by weight high energy feedstuffs (corn and molasses) are effective in preventing liver abscesses in cattle fed these rations. As previously mentioned, high energy feedstuffs are considered to be rations which have a minimum net energy value of about 1.6 M Cal/Kg. The rations also may have higher net energy values.

The dried brewers grains may be combined with an antibiotic such as Terramycin. A suitable combination is 5 percent by weight dried brewers grains and 10 mg/day of Terramycin. This is considered to be substantially equivalent to 10 percent dried brewers grains and is more effective than the usual ration additive of 70 mg/day of Terramycin.

Small amounts of other roughage and other sources of protein such as urea, cottonseed meal, soybean mean, etc., can also be included in the ration.

At least about 5 percent dried brewers grains must be included in the ration to achieve the desired results.

In Example I no digestive disturbances or liver abscesses developed in steers fed ground shell corn and dried brewers grains at three different levels for 84 days. This demonstrates that cattle fed on rations containing a 10 and 20 percent level of dried brewers grains and ground corn with a fiber content of 5 percent or less do not develop liver abscesses.

EXAMPLE NO. I

Three finishing rations composed of ground shell corn and dried brewers grains at the 10, 20 and 30 percent levels were fed to 36 steers for 84 days. The animals were placed in separate pens of six animals each, so there were 12 cattle on each ration. The chemical analysis of the rations are shown in Table III. The 10 percent brewers ration contained 3.6 percent fiber. All the rations had a net energy value over 1.7 M Cal/Kg of ration.

TABLE III

| Ration | | | Fat % | Crude Fiber % | Crude Protein % | Net Energy M Cal/Kg |
|---|---|---|---|---|---|---|
| Ground corn | + 10% | Brewers Grains | 4.6 | 3.6 | 10.9 | 1.83 |
| do. | + 20% | do. | 4.8 | 5.0 | 12.0 | 1.78 |
| do. | + 30% | do. | 4.5 | 6.3 | 13.5 | 1.71 |

EXAMPLE NO. II

In Example II, 58 head of beef cattle were placed on the ration shown in Table IV. The control ration contained no brewers grains. The animals were grouped so that there were two pens of animals on each diet. The animals were divided as evenly as possible in each pen. After 140 days of feeding the animals were slaughtered and there were essentially no typical liver abscesses in any cattle receiving the brewers grains.

Of the 12 head of cattle fed control ration without brewers grains there were five typical liver abscesses in five head of cattle.

The feeding trial again demonstrated that when dried brewer grains are incorporated into a high energy ration with net energy value of 1.70 M Cal/Kg at a level as low as 15 percent by weight and the total crude fiber of the ration was as low as 4.0 percent, there were no evidence of liver abscesses in cattle fed the ration.

TABLE IV

|  | 15% B.D.B.* with yeast | 15% B.D.B.* | 45% B.D.B.* | 75% B.D.B.* | Control |
|---|---|---|---|---|---|
|  | % | % |  |  |  |
| Brewers Grains |  | 15 | 45 | 75 |  |
| Brewers Grains with Yeast | 15 |  |  |  |  |
| Cracked Corn | 77.55 | 77.55 | 47.55 | 17.55 | 77.55 |
| Molasses | 5.00 | 5.00 | 5.00 | 5.00 | 5.00 |
| Corn Gluten Feed | — | — | — | — | 10.50 |
| Oat Hulls |  |  |  |  | 4.50 |
| Salts, vit. | 2.45 | 2.45 | 2.45 | 2.45 | 2.45 |
| Total | 100.00 | 100.00 | 100.00 | 100.00 | 100.00 |
| Crude Protein | 14.6 | 11.9 | 15.5 | 25.6 | 10.5 |
| Crude Fiber | 5.4 | 1.0 | 8.6 | 11.4 | 3.6 |
| Net energy M Cal/Kg | 1.70 | 1.70 | 1.50 | 1.26 | 1.70 |

*Dried Brewers Grains

What we claim is:

1. A method of preventing the development of liver abscesses in cattle fed on rations containing at least about 75 percent of high energy concentrates selected from the group consisting of corn, grain sorghums, wheat, barley, and molasses and having a minimum net energy value of about 1.6 M. Cal./Kg by adding from about 5 percent to about 20 percent dried brewers grains to the ration as an additional source of crude fiber and protein and feeding the ration to the cattle.

2. The method of claim 1 wherein the finishing ration contains at least about 10 percent dried brewers grains.

3. The method of claim 1 wherein the dried brewers grains contains spent hops.

4. The method of claim 1 wherein the ration contains less than 5 percent crude fiber in the total ration including that furnished by the dried brewers grains.

5. The method of claim 4 wherein the ration contains at least about 15 percent dried brewers grains.

6. The method of claim 4 wherein the dried brewers grains contain dried spent hops.

7. A method of preventing the development of liver abscesses in cattle by feeding said cattle on rations containing 75 percent or more of high energy concentrates selected from the group consisting of corn, grain sorghums, wheat, barley, and molasses and having a minimum net energy value of about 1.6 M. Cal./Kg and a supplement containing dried brewers grains with other nutrients, said brewers grains constituting from about 5 percent to about 20 percent of the ration.

8. The method of claim 7 wherein the dried brewers grains in the supplement contains spent hops.

* * * * *

Dedication and Disclaimer

3,821,416.—*Granville B. Thompson*, Crestwood, and *Robert D. Seeley*, Columbia, Mo. DRIED BREWERS GRAIN IN HIGH ENERGY ANIMAL FEEDS. Patent dated June 28, 1974. Disclaimer and dedication filed Mar. 17, 1976, by the assignees, *The Curators of the University of Missouri* and *Anheuser-Busch, Incorporated*.

Hereby disclaim and dedicate to the Public the term of said patent subsequent to Mar. 15, 1976.

[*Official Gazette May 4, 1976.*]